L. PRANGE.
FILTERING APPARATUS.
No. 174,297.  Patented Feb. 29, 1876.
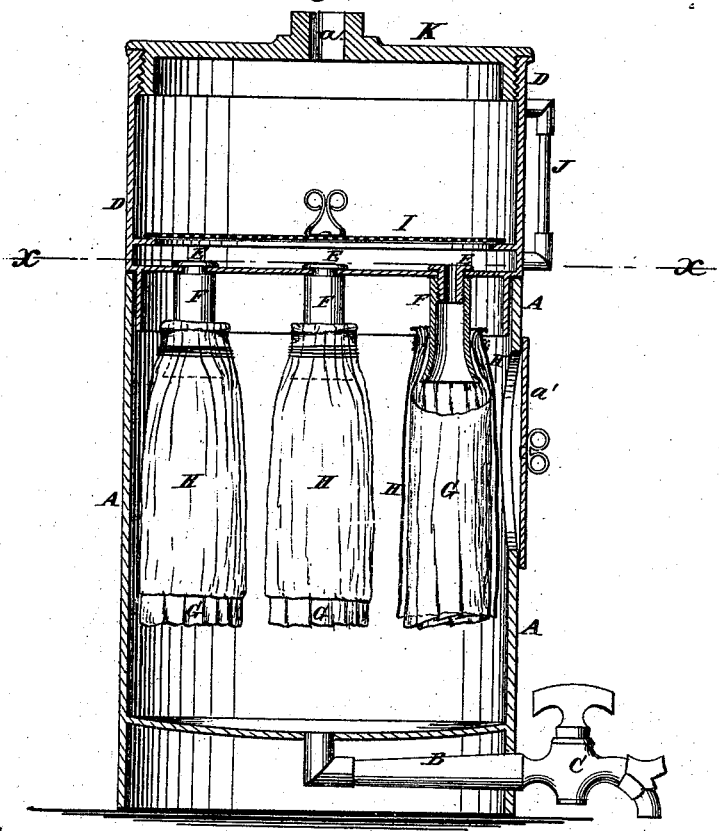
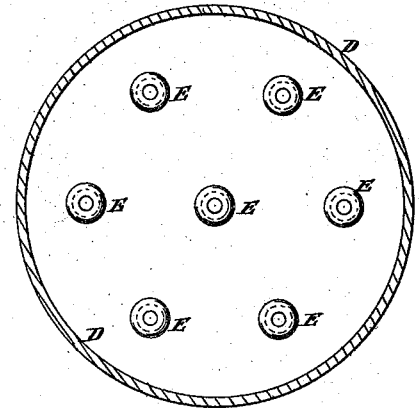
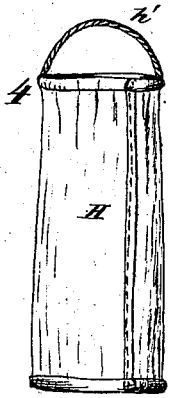
WITNESSES:
N. W. Almqvist
John Goethals
INVENTOR:
Leo Prange
BY
ATTORNEYS.

UNITED STATES PATENT OFFICE.

LEO PRANGE, OF SOUTH BROOKLYN, NEW YORK.

IMPROVEMENT IN FILTERING APPARATUS.

Specification forming part of Letters Patent No. 174,297, dated February 29, 1876; application filed January 7, 1876.

*To all whom it may concern:*

Be it known that I, LEO PRANGE, of South Brooklyn, in the county of Kings and State of New York, have invented a new and useful Improvement in Filtering Apparatus, of which the following is a specification:

Figure 1 is a vertical section of my improved filtering apparatus. Fig. 2 is a cross section of the same, taken through the line $x\,x$, Fig. 1. Fig. 3 is a detail view of the inner bag. Fig. 4 is a detail view of the outer bag.

Similar letters of reference indicate corresponding parts.

My invention is an improvement in the class of spirit, wine, and sirup filters in which the liquid is passed through a body of charcoal and a series of bags, formed of woven fabric and suspended vertically from short tubes attached to the bottom of a tank. The improvement relates to the construction and arrangement of certain parts, as hereinafter described and claimed.

A is the filter-vessel proper, and D the vessel into which the liquor is first received. The vessel A has a cover, K, provided with a nozzle, $a$, for attachment of a hose leading from a tank or cask containing the liquid to be filtered. The bottom of said vessel is concave, and provided with discharge-pipe B, which terminates with a discharge-cock, C. The bottom of vessel B has a series of holes, in which are fitted short flanged tubes E. The filter-bags are composed of an inner part, G, and outer part, H, the latter having a handle or cord, $h'$, attached by which they may be hung up to drip after being used. The bags are suspended from tubes E by means of tapered tubes F, as shown, and may be changed or removed, as occasion requires, through the door $a'$ of vessel A.

In order to support the charcoal necessarily employed as a filtering medium, I employ the strainer I, which is supported on a circular flange of vessel D, and forms the second or false bottom thereof. The liquor filters through the charcoal and enters the space between the bottom or strainer I, whence it escapes into vessel A as fast as it can ooze through the bags G H. It is obviously important that the height of the liquor in vessel D shall be readily ascertainable, and to this end I attach the glass tube J to the outer side of said vessel, as shown, and, in order that the tube may not become choked, or coated with charcoal, or impurities floating in the liquor, the lower end of the tube is made to communicate with the space between the false and true bottom, so that only clear or filtered liquor can enter the tube.

Having thus described my invention, I claim as new, and desire to secure by Letters Patent—

The vessel D, provided with the false-bottom I and the indicator tube J, attached exteriorly and communicating with the space beneath the strainer, as shown and described, for the purpose specified.

LEO PRANGE.

Witnesses:
  JAMES T. GRAHAM,
  T. B. MOSHER.